(12) United States Patent
Shanks

(10) Patent No.: US 9,976,412 B2
(45) Date of Patent: May 22, 2018

(54) DATA COMMUNICATIONS SYSTEM

(71) Applicant: Zenith Oilfield Technology Limited, Thainstone, Inverurie, Aberdeenshire (GB)

(72) Inventor: David Sirda Shanks, Aberdeen (GB)

(73) Assignee: Zenith Oilfield Technology Limited, Aberdeenshire (GB)

( * ) Notice: Subject to any disclaimer, the term of this patent is extended or adjusted under 35 U.S.C. 154(b) by 335 days.

(21) Appl. No.: 14/383,769

(22) PCT Filed: Feb. 28, 2013

(86) PCT No.: PCT/GB2013/050511
§ 371 (c)(1),
(2) Date: Sep. 8, 2014

(87) PCT Pub. No.: WO2013/132233
PCT Pub. Date: Sep. 12, 2013

(65) Prior Publication Data
US 2015/0109138 A1 Apr. 23, 2015

(30) Foreign Application Priority Data

Mar. 8, 2012 (GB) .................................... 1204126.5
May 24, 2012 (GB) .................................... 1209141.9
(Continued)

(51) Int. Cl.
*G01V 3/00* (2006.01)
*E21B 47/12* (2012.01)
(Continued)

(52) U.S. Cl.
CPC ............ *E21B 47/12* (2013.01); *E21B 43/128* (2013.01); *H04B 3/54* (2013.01); *H04B 2203/5466* (2013.01); *H04B 2203/5475* (2013.01)

(58) Field of Classification Search
CPC ...... E21B 47/12; E21B 47/122; E21B 17/028; E21B 43/128; E21B 17/003; E21B 33/0355; E21B 34/10; E21B 41/00; E21B 41/0085
See application file for complete search history.

(56) References Cited

U.S. PATENT DOCUMENTS 3,959,767 A * 5/1976 Smither .................. E21B 47/12
340/855.3
4,157,535 A 6/1979 Balkanli
(Continued)

FOREIGN PATENT DOCUMENTS

CN 1152784 A 6/1997
CN 1988404 A 6/2007
(Continued)

OTHER PUBLICATIONS

Unofficial English Translation of Chinese Office Action issued in connection with corresponding CN Application No. 201380012799.X dated Aug. 5, 2015.
(Continued)

*Primary Examiner* — Joseph Feild
*Assistant Examiner* — Rufus Point
(74) *Attorney, Agent, or Firm* — GE Global Patent Operation

(57) ABSTRACT

A system and method for transmitting data over a three phase power system between a surface and a sub-surface location. A first power supply providing a first AC power signal and a second power supply providing a second AC power signal are at the surface. A first powered module and a second powered module which provides a data communications signal are at the sub-surface. A cable connection is provided between the surface and the sub-surface to transmit the power and data communication signals. The data communications signal provides an indication of power applied (Continued)

to the second powered module and a power signal is varied in response to the applied power. The invention finds specific application monitoring down hole equipment such as an electrical submersible pump in a wellbore.

26 Claims, 4 Drawing Sheets

(30) Foreign Application Priority Data

| Jul. 4, 2012 | (GB) | .................................. | 1211806.3 |
| Aug. 28, 2012 | (GB) | .................................. | 1215281.5 |

(51) Int. Cl.
*H04B 3/54* (2006.01)
*E21B 43/12* (2006.01)

(56) References Cited

U.S. PATENT DOCUMENTS

| 4,739,325 | A | * | 4/1988 | MacLeod | ............. | E21B 17/003 |
| | | | | | | 324/342 |
| 4,788,545 | A | * | 11/1988 | Farque | .................... | E21B 47/12 |
| | | | | | | 166/66 |
| 5,334,877 | A | | 8/1994 | Mohan et al. | | |
| 5,493,288 | A | * | 2/1996 | Henneuse | ............... | E21B 47/12 |
| | | | | | | 340/853.3 |
| 5,515,038 | A | | 5/1996 | Smith | | |
| 5,677,974 | A | | 10/1997 | Elms et al. | | |
| 5,941,307 | A | | 8/1999 | Tubel | | |
| 5,995,020 | A | * | 11/1999 | Owens | .................... | E21B 47/12 |
| | | | | | | 166/250.01 |
| 6,260,615 | B1 | | 7/2001 | Dalrymple et al. | | |
| 6,396,415 | B1 | | 5/2002 | Bulmer | | |
| 6,459,557 | B1 | | 10/2002 | Haensgen et al. | | |
| 6,587,037 | B1 | * | 7/2003 | Besser | .................. | E21B 43/128 |
| | | | | | | 340/538.11 |
| 7,615,893 | B2 | | 11/2009 | Biester et al. | | |
| 7,660,365 | B2 | | 2/2010 | Koga et al. | | |
| 7,686,074 | B2 | | 3/2010 | McCoy et al. | | |
| 7,787,525 | B1 | * | 8/2010 | Clark, Jr. | ............ | H04L 27/2608 |
| | | | | | | 340/855.4 |
| 7,982,633 | B2 | * | 7/2011 | Booker | .................... | H04B 3/54 |
| | | | | | | 340/853.3 |
| 8,174,145 | B2 | | 5/2012 | Goedecke et al. | | |
| 8,362,916 | B2 | | 1/2013 | Tjhang et al. | | |
| 2003/0151977 | A1 | | 8/2003 | Shah et al. | | |
| 2005/0190584 | A1 | | 9/2005 | Hernandez-Marti et al. | | |
| 2005/0283277 | A1 | * | 12/2005 | Schulz | ................ | E21B 41/0021 |
| | | | | | | 700/282 |
| 2006/0145833 | A1 | | 7/2006 | Brandt et al. | | |
| 2006/0247861 | A1 | * | 11/2006 | McCoy | .................... | G01V 1/40 |
| | | | | | | 702/14 |
| 2007/0138867 | A1 | | 6/2007 | Choi et al. | | |
| 2008/0112885 | A1 | | 5/2008 | Okunev et al. | | |
| 2008/0273602 | A1 | | 11/2008 | Glen | | |
| 2009/0021393 | A1 | | 1/2009 | Layton et al. | | |
| 2009/0044938 | A1 | | 2/2009 | Crossley et al. | | |
| 2009/0133487 | A1 | | 5/2009 | Jeffryes | | |
| 2009/0250210 | A1 | | 10/2009 | Allen et al. | | |
| 2010/0194585 | A1 | | 8/2010 | Skinner et al. | | |
| 2011/0075304 | A1 | | 3/2011 | Hamer | | |
| 2011/0205080 | A1 | | 8/2011 | Millot et al. | | |
| 2011/0301850 | A1 | | 12/2011 | Maao | | |
| 2012/0008961 | A1 | | 1/2012 | Chen et al. | | |
| 2012/0026003 | A1 | | 2/2012 | Layton | | |
| 2012/0037354 | A1 | | 2/2012 | McCoy et al. | | |
| 2012/0194313 | A1 | | 8/2012 | Wohlforth | | |
| 2014/0152459 | A1 | * | 6/2014 | Olson | ...................... | H04B 3/23 |
| | | | | | | 340/854.9 |
| 2015/0176397 | A1 | * | 6/2015 | Shanks | .................... | H04B 3/54 |
| | | | | | | 340/854.9 |

FOREIGN PATENT DOCUMENTS

| CN | 101015108 | A | 8/2007 |
| CN | 101056181 | A | 10/2007 |
| CN | 101218756 | A | 7/2008 |
| CN | 101263663 | A | 9/2008 |
| CN | 102369461 | A | 3/2012 |
| GB | 2283889 | A | 5/1995 |
| GB | 2352150 | A | 1/2001 |
| GB | 2394631 | A | 4/2004 |
| GB | 2401295 | A | 11/2004 |
| GB | 2416097 | A | 1/2006 |
| GB | 2483384 | A | 3/2012 |
| WO | 0186831 | A1 | 11/2001 |
| WO | 2008011889 | A1 | 1/2008 |
| WO | 2011072732 | A1 | 6/2011 |
| WO | 2012004000 | A2 | 1/2012 |

OTHER PUBLICATIONS

Unofficial English Translation of Chinese Office Action issued in connection with related CN Application No. 201380012798.5 dated Sep. 1, 2015.
Non-Final Office Action issued in connection with related U.S. Appl. No. 14/383,719 dated Mar. 22, 2016.
Non-Final Office Action issued in connection with related U.S. Appl. No. 14/383,790 dated Mar. 28, 2016.
Unofficial English Translation of Chinese Office Action issued in connection with related CN Application No. 201380012881.2 dated Jun. 30, 2015.
Unofficial English Translation of Chinese Office Action issued in connection with corresponding CN Application No. 201380012666.2 dated Jul. 1, 2015.
David Sirda Shanks, Sep. 8, 2014, U.S. Appl. No. 14/383,719.
David Sirda Shanks, Sep. 8, 2014, U.S. Appl. No. 14/383,745.
David Sirda Shanks, Sep. 8, 2014, U.S. Appl. No. 14/383,790.
PCT Search Report issued in connection with corresponding Application No. PCT/GB2013/050510 dated Apr. 26, 2016.
PCT Search Report issued in connection with corresponding Application No. PCT/GB2013/050508 dated Jun. 14, 2013.
PCT International Preliminary Report on Patentability issued in connection with corresponding Application No. PCT/GB2013/050511 dated Sep. 18, 2014.
PCT International Preliminary Report on Patentability issued in connection with corresponding Application No. PCT/GB2013/050512 dated Sep. 18, 2014.
Great Britain Search Report issued in connection with related GB Application No. 1204126.5 dated Aug. 20, 2012.
U.S. Final Office Action issued in connection with related U.S. Appl. No. 14/383,719 dated Sep. 6, 2016.
U.S. Final Office Action issued in connection with related U.S. Appl. No. 14/383,790 dated Sep. 22, 2016.
U.S. Advisory Action issued in connection with related U.S. Appl. No. 14/383,790 dated Dec. 13, 2016.
U.S. Final Office Action issued in connection with related U.S. Appl. No. 14/383,719 dated Apr. 12, 2017.
Great Britain Office Action issued in connection with related GB Application No. 1204126.5 dated Apr. 25, 2017.

* cited by examiner

DATA COMMUNICATIONS SYSTEM

BACKGROUND OF THE INVENTION

The present invention relates to data transmission to and from down hole equipment and in particular, though not exclusively, to an improved data communication system and a method of data transmission through a three phase power system between the sub-surface and a surface location.

"Down hole equipment" is understood to refer to any tool, equipment or instrument that is used in a wellbore.

Data needs to be transmitted between down-hole equipment and the surface for various reasons. For example, monitoring performance of motors/pumps; transmission of control signals for control of valves; measuring device orientation and position, and making physical measurements.

For motorised down hole equipment, such as an Electric Submersible Pump (ESP) motor system, data needs to be sent from below the equipment in a circuit that includes motor windings and the equipment's power cable which can be considered as a three phase power system. In such arrangements, as power cables are already present, there is the rationale that the cost of the solution of using these should be proportionately less than a solution where an appropriate length of communication cables is also supplied. It is also generally accepted that being able to maintain power on the down hole monitoring instrumentation when the main 3-phase power system is not powered up is needed, as this provides essential information in the event of pump shut downs or other major events in the well.

Thus these systems are challenging to design and operate to ensure data is successfully transmitted and an independent power supply is maintained at all times.

Due to the motor and power cable properties of a three phase power system, DC current based devices which are coupled to the power system using inductive couplings have been developed and are extensively used. Power is provided from a low current DC power supply at surface and data is transmitted to surface by modulating the current or voltage drawn from this supply.

Examples of digital and processor based devices are disclosed in U.S. Pat. No. 5,515,038; GB2283889 and U.S. Pat. No. 6,396,415. These systems utilise DC current injected onto the power signal and extracted through inductive Y-point couplings. These systems are all susceptible to failure when insulation on the power cable is lost or damaged, as any fault is in parallel with the independent power source, and the fault becomes another current modulation source thus causing signal integrity to be lost. These prior art systems are also typically either analogue in nature, thus introducing noise and uncertainty into the measurements or, where digital data is transmitted, it is at a very slow data rate.

AC based systems which make use of AC power and/or signal transmission have been developed to overcome these problems. However, these AC based systems introduce disadvantages of their own. A typical prior art AC based system is disclosed in U.S. Pat. No. 7,982,633 being a data communication system for use in down hole applications wherein electrical energy is supplied over a multiple-conductor power cable to an ESP motor assembly. A down hole unit is AC-coupled to the conductors of the power cable through the wye point of the ESP motor assembly. A surface unit is AC-coupled to the conductors of the power cable. Uplink communication of telemetry data occurs over an AC communication scheme supported by the down hole unit and the surface unit. Downlink communication of remote control command data occurs over a different AC communication scheme supported by the surface unit and the down hole unit. These AC communication schemes provide an independent supply of power to the down hole environment. All communication between the surface and down hole environment is accomplished through the power cable without the use of additional communication lines. Data communication is maintained in the event of a ground fault on the power cable.

The expressed intention of such prior art AC based systems is to operate when the insulation on the power cable is damaged or at least imperfect. However, a disadvantage of these systems is that while the amount of power delivered is known for a fixed cable length and size in normal operating conditions, any fault on the cable adjusts these and thus will have a profound effect on the amount of power delivered. The power delivered to the down hole unit can therefore be detrimentally affected causing damage and potential loss of monitoring and data communication at the down hole unit. In U.S. Pat. No. 7,982,633 there is disclosed an arrangement where high pass filtering is used to remove the low frequency motor power, typically around 25-60 Hz, applied across the down hole unit. In practice, however, the AC power injected into the motor assembly is strongly affected by the reactive components in the motor assembly. These reactive components may include the inductance of the surface transformers, the capacitance of the down hole cable, and the inductance of the down hole motor. It is therefore possible that in normal running conditions a stable and useful power supply is provided to the down hole unit but when an insulation fault appears, the reactance of the motor assembly to which the down hole unit is exposed changes radically causing the power delivered to change significantly. This change in power delivered to the down hole unit may be an increase or a decrease. If a decrease in power occurs, the down hole monitoring unit may cease to function. Should the power increase too much, the down hole monitoring unit may fail or may, at the very least, have a shorter service life than would be expected due to the stressed operating conditions.

SUMMARY OF THE INVENTION

It is therefore an object of the present invention to provide a system and method for transmitting data over a three phase power system wherein the power delivered to a down hole unit is held constant regardless of operating conditions of the three phase power system.

According to a first aspect of the invention there is provided a data communications system for transmitting data over a three phase power system between a surface and a sub-surface location, said data communications system comprising: a surface system module provided with a first power supply providing a first AC power signal and a second power supply providing a second AC power signal; a sub-surface system module providing a first powered module and a second powered module wherein the second powered module provides a data communications signal; a cable connection provided between the surface system module and the sub-surface system module to transmit the power and data communication signals; and wherein the data communications signal provides an indication of power applied to the second powered module and a power signal is varied in response to the applied power.

In this way, power applied to a down hole data transmission system can be regulated to ensure the integrity of the data transmission.

In an embodiment, the second powered module includes means to determine an applied voltage. In this way, the applied voltage can be transmitted in the data communications signal to the surface system module and used vary a power signal. In an embodiment, the second AC power signal is regulated in response to the applied voltage.

Optionally, the second powered module may include an AC coupling circuit. In this way, power applied to the second powered module may be varied by altering the frequency of a power signal. In an embodiment, a frequency of the first AC power signal is in the range 20 Hz to 60 Hz. In an embodiment, a frequency of the second AC power signal is in the range 500 Hz to 5 KHz. In this way, the AC coupling may permanently prevent power being applied by one AC power signal while allowing the power applied by the other AC power signal to be altered.

In an embodiment, the first powered module is a motor assembly. In an embodiment, the first powered module is an ESP motor system.

In an embodiment, the second powered module is a monitoring system. In an embodiment, the monitoring system comprises one or more gauges/sensors and the data communication signal comprises data from the one or more gauges/sensors.

In an embodiment, the first AC power signal is used to power the first powered module and the second AC power signal is used to power the second powered module. In an embodiment, the second AC power signal is varied in response to applied power. In this way, applied power is regulated on the second powered module, which maintains optimal functioning of a monitoring system and associated data transmission.

According to a second aspect of the invention there is provided a method of data transmission for transmitting data over a three phase power system between a surface and a sub-surface location, the method comprising the steps of: (a) providing a cabled connection from the surface to a sub-surface system; (b) providing first and second AC power signals down the cabled connection; (c) determining power applied at a unit of the sub-surface location; (d) communicating a data signal indicative of the determined power applied up the cabled connection; and (e) varying an AC power signal at the surface to vary the power applied.

In an embodiment, the method includes the step of setting a desired power level required by the unit.

In an embodiment, step (d) comprises transmitting a voltage applied to the unit.

In an embodiment, the method includes the step of providing a feedback loop to actively control the power level at the unit.

In an embodiment, the first AC power signal is used to power a down hole motor assembly. In an embodiment, the first AC power signal is in a frequency range of 20 Hz to 60 Hz.

In an embodiment, the second AC power signal is used to power a down hole monitoring system. In an embodiment, the second AC power signal is in a frequency range of 500 Hz to 5 KHz.

In an embodiment, the monitoring system includes a tuned circuit to prevent transmission of the first AC power signal from reaching the monitoring system.

In an embodiment, the method includes the step of varying frequency of the second AC power signal. In an embodiment, the method may include the step of sweeping the frequency of the second AC power signal. Varying the frequency in combination with the use of a tuned circuit will effectively alter the power delivered.

In an embodiment, the step of sweeping the frequency is performed if no data signal is received at the surface or if the data signal is lost. In an embodiment, the frequency is swept until a data signal is received.

In an embodiment, a sudden change in the indicative power applied via the data signal is used to alert a user to a possible fault in the cabled connection. In an embodiment, on detection of a fault the first AC power signal is removed while still transmitting data from the monitoring system.

BRIEF DESCRIPTION OF THE DRAWINGS

The present invention will now be described, by way of example only, with reference to the accompanying drawings, in which.

DETAILED DESCRIPTION

One category of down hole equipment is artificial lift systems, for use in wells where there is insufficient pressure in the reservoir to lift the well's fluid (e.g. oil, water or gas) to the surface. Types of artificial lift systems include hydraulic pumps, Rod pumps, Electric Submersible Pumps (ESPs), Jet Pumps, Progressing-Cavity pumps (PCPs) and gas lift.

Figure 1:
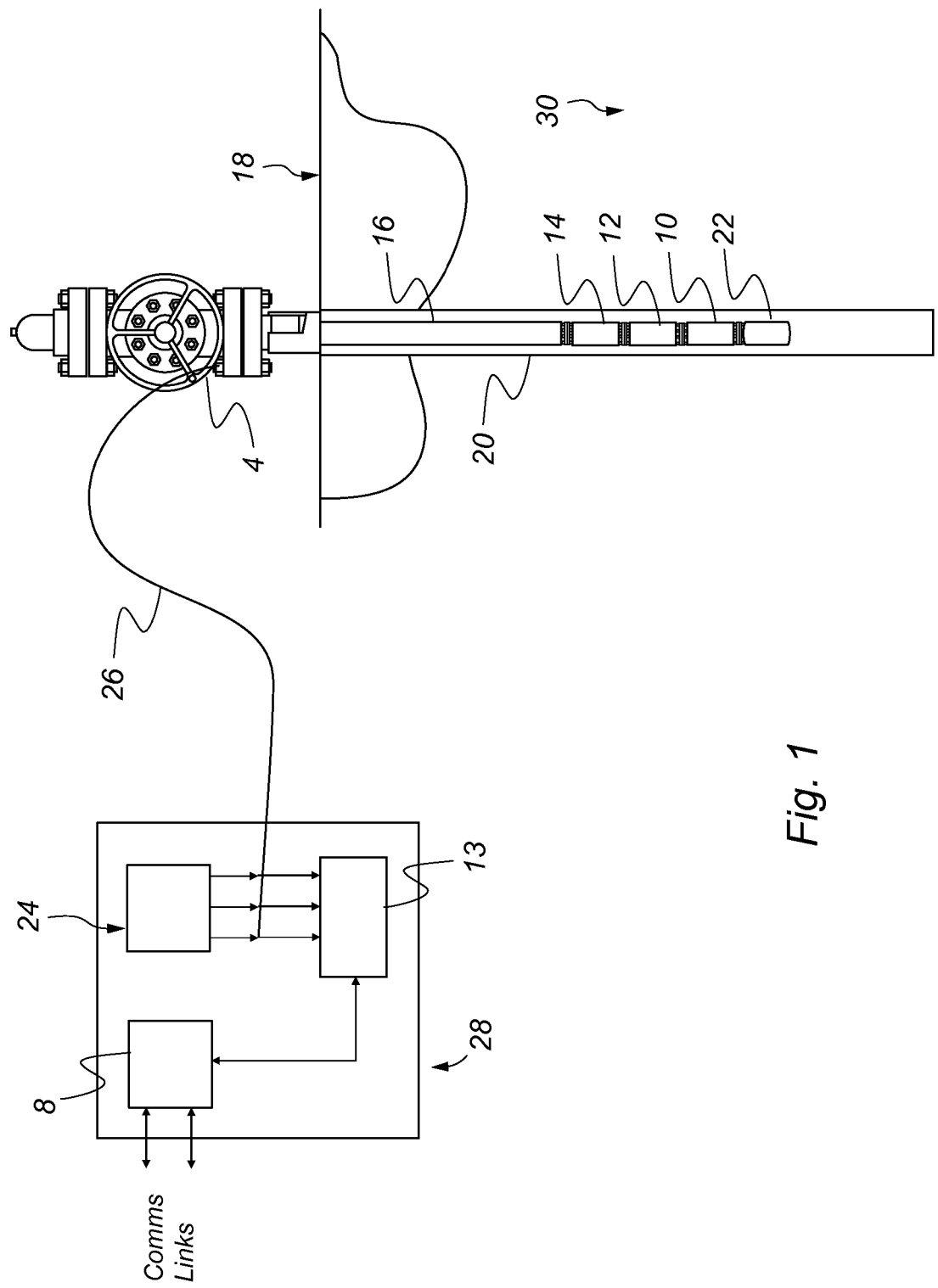
FIG. 1 shows the typical set up of a down hole equipment in a well, showing the positions of the equipment, the motor and the control interfaces at the surface.

Reference is initially made to FIG. 1 of the drawings which illustrates a typical ESP completion in a wellbore. An ESP motor 10 is coupled through a seal 12 to a centrifugal pump 14 and used to lift the fluids through a tubing 16 to a surface 18 of the well 20 in a manner known to those skilled in the art. In order to monitor the operation, sensors or gauges 22 are located below the ESP 10. Typically, the motor 10 is a three phase Y configuration. The motor is driven by a variable speed drive system 24 and is connected via a three phase power cable 26. The system can be considered to comprise two distinct parts, a surface system, generally indicated by reference numeral 28, and a down hole system, generally indicated by reference numeral 30. These two parts 28,30 communicate using the ESP power cable 26.

Surface equipment relating to the gauge system is shown in FIG. 1 where there is a HV unit 13 connected directly to the 3 phase power supply to the down hole motor and there is a further LV or low voltage unit 8 which is safely isolated from the high voltage system. The LV system is primarily for data recovery and processing and data display etc. The HV unit is used to inject AC power and also make recovery of raw data from the 3-phase power system.

Figure 2:
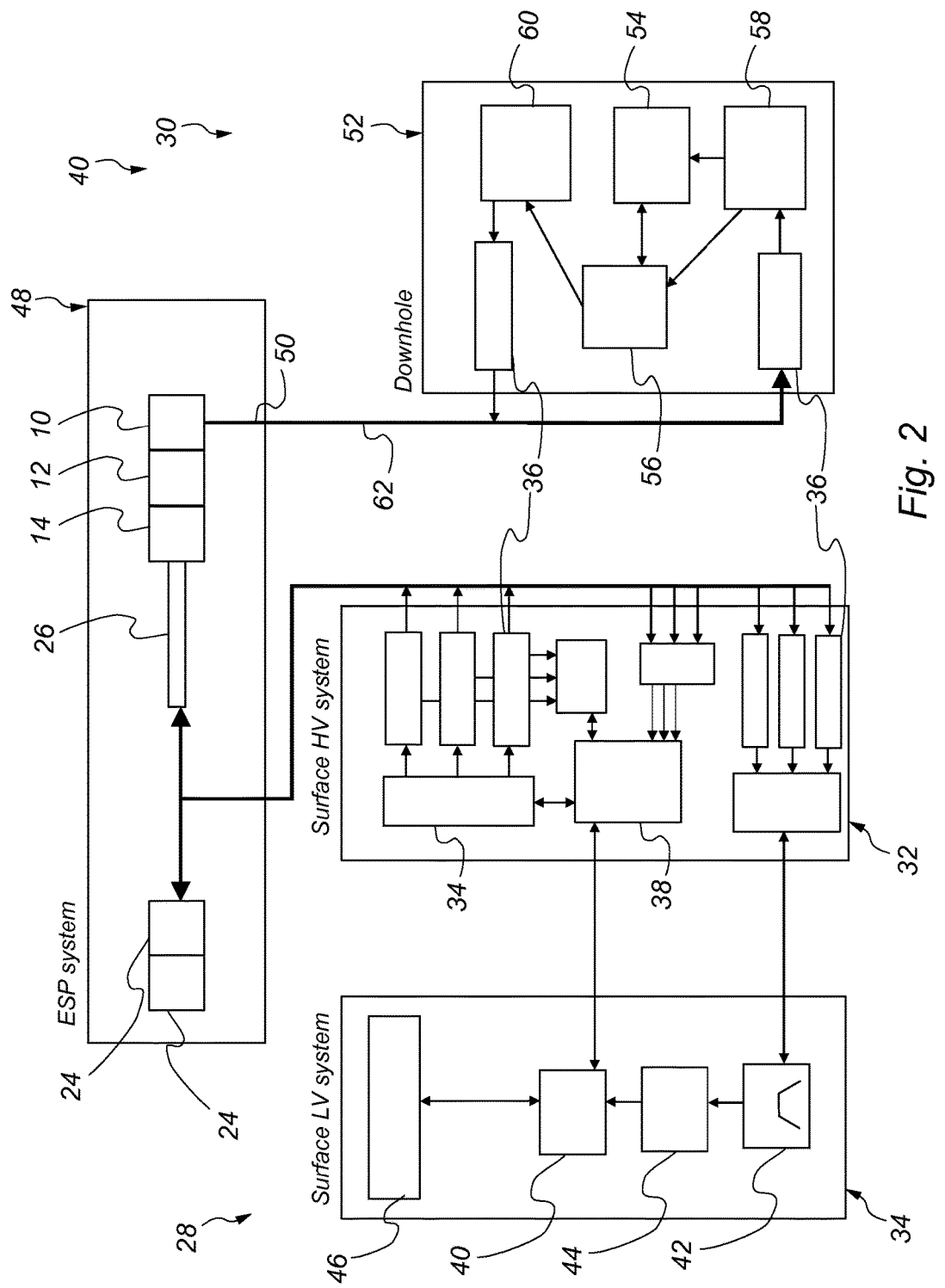
FIG. 2 shows a schematic block diagram of a data communication system according to a first embodiment of the present invention.

Referring now to FIG. 2 of the drawings there is illustrated a functional block diagram of a data transmission system, generally indicated by reference numeral 40, according to an embodiment of the present invention. In this arrangement data can be transmitted onto the three phase power cable 26 in either direction between the surface equipment 28 and subsurface or down hole equipment 30.

At surface 28 the equipment is divided into a high voltage side 32 and a low voltage side 34. The high voltage side 32 provides the power to the down hole system 30. Tuned high-voltage AC coupling 36a is used to connect to each of the phases in the power cable 26. Thus a tripling of circuitry is used in the high-voltage equipment 32. A microprocessor 38 controls the power distribution on to the three-phase cable 26 and is linked to a corresponding microprocessor 41 on the low voltage side 34. Additionally the high-voltage side 32 uses tuned high-voltage AC coupling 36c, in parallel to pick off the data signals on the three-phase cable 26. These signals are then filtered 42 and de-modulated 44 by known methods. Data signals then pass via the microprocessor 41 for display 46 or transport to a data logger or SCADA system. Additionally, the process can work in reverse where microprocessor 41 provides data on to the power lines 26 via the tuned high-voltage AC coupling 36 on the high-voltage side 32 as is known in the art.

Down hole an ESP system 48 is provided as described herein with reference to FIG. 1. Like parts have the same reference numerals to aid clarity. Below the motor 10 is a standard Y-point connector 50. At the Y-point connector 50 is arranged a down hole system 52. The down hole system 52 provides monitoring in the form of measurement devices sensors or gauges 54, hooked up via a microprocessor 56. Power to drive the gauges 54 is provided via tuned HV AC coupling circuits 36b to a power regulator 58. Similarly, data from the measurement devices 54 is processed in the microprocessor 56. Using a signal driver 60 and tuned HV AC coupling circuits 36d, the data is transmitted on to the power line 62 for transmission to the Y-point 50 and onward transmission up the three-phase power cable 26 to the surface units 28.

In the present invention, a first AC power signal is generated at the drive system 24. This is a three phase power signal which is typically large e.g. 2000 volts and 24 amps and at a low frequency, in the range 20 to 60 Hz. It is used to power the motor 10. A second AC power signal is generated at the power driver 34 in the surface HV system 32. This second AC power signal is modulated with any required data signal and passed onto each phase of the power cable 26. The second AC power signal is of a lower voltage and current with a higher frequency in the range 500 Hz to 5 kHz. The second AC power signal will pass through the wye point 50 and pass into the down hole system 52. A tuned HV AC coupling circuit 36 at the input is tuned to prevent transmission of the first AC power signal which could damage the down hole instrumentation 54. The power regulation circuit 58 will convert the second AC power signal into an appropriate form for powering the instrumentation 54. While the second AC power signal is considered to be independent of the first AC power signal, this is not the case as, in the event of a cable insulation failure, the power delivered to the instrumentation 54 will vary. This effect is best illustrated in FIGS. 3A and 3B.

Figure 3A:
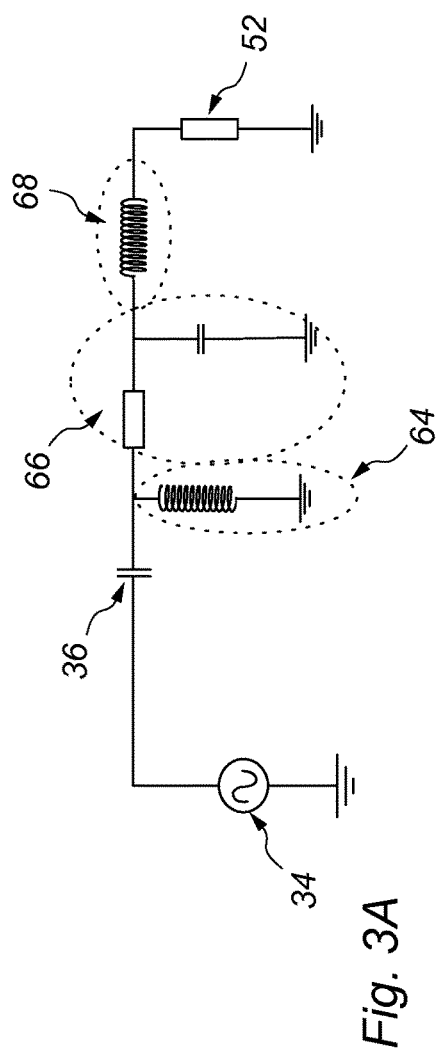
FIGS. 3A and 3B are motor circuit equivalents under (3A) normal and (3B) ground fault conditions.

FIG. 3A illustrates the electrical loading of a monitoring system which is superimposed on a 3-phase power system, and relies on ground isolation for operation. FIG. 3A shows a healthy motor system with the instrument supply 34 connected to the 3-phase motor system 10 through a coupling (normally a capacitor) 36. The surface drive transformer will present a small inductive load 64. The cable 26 between the surface 28 and the down hole motor 10 will have resistance and capacitance to ground from the metallic sheath 66 and the down hole motor 10 will appear as a series inductance 68 before power is conveyed to the down hole unit 52.

Figure 3B:
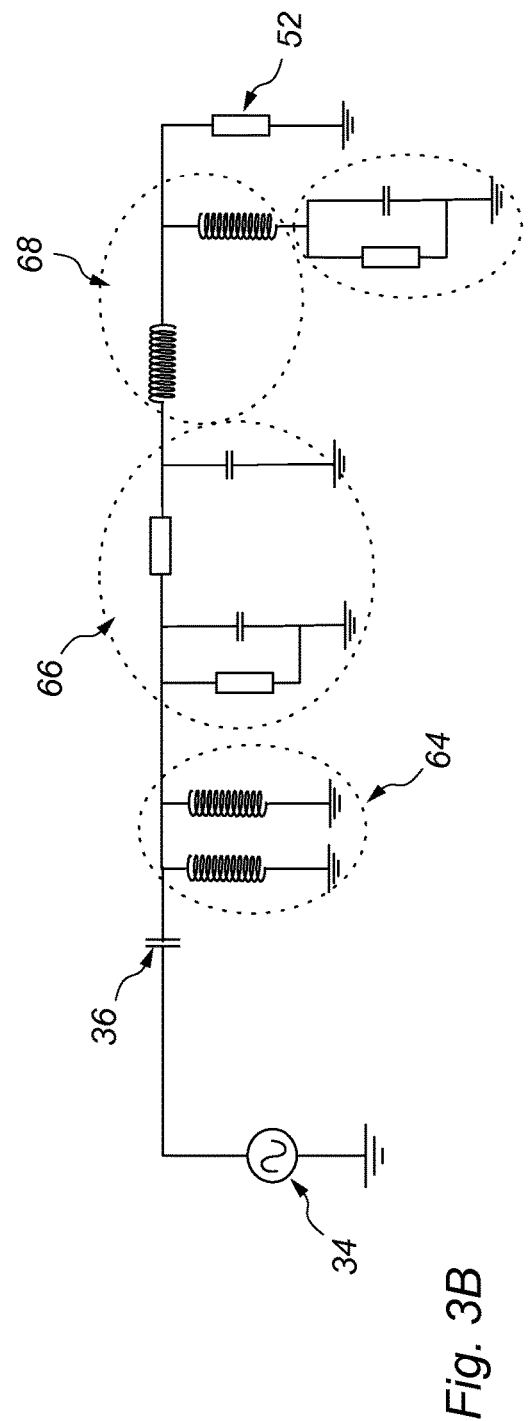

FIG. 3B shows the same equipment with the insulation of the cable leaking to ground. The supply 34 is the same, but the surface transformer is now a significant load to ground 64. Note that the inter conductor capacitance which has no effect with good insulation now adds to the capacitance to ground to make the cable load 66 much higher. The motor with one winding, now connected at some level to ground via the cable 70, also now acts as a voltage divider 72 which is frequency dependent thus reducing the voltage across the unit 52 significantly. Note also in 3-phases the loading on the downhole signal driver 60 increases too and isolating the surface unit 32 from the shorted phase can reduce the total load both on the surface supply 34 and the down hole driver 60.

The applied power to the down hole unit 52 is determined at the power regulation section 58 in the down hole unit 52. This data signal is modulated onto the returning data signal to surface via the microprocessor 56, signal driver 60 and coupling 36. The data is extracted as described hereinbefore at the surface units 32,34. Microprocessor 41 will relay the power data to the microprocessor 38 which can then regulate by adjusting the power drivers 34 input as a second AC signal upon the cable 26. If desired the frequency of the second AC signal can also be adjusted. This change in power delivered to the down hole unit 52 will be picked-up by the regulator 58 and thus an effective feedback loop is created to provide a regulated power supply to the down hole unit 52. Any failures on the cable will cause a change in power applied which will be detected at the regulator 58. The data signal to surface will indicate a change in the power delivered and the driver 34 will inject a compensating power level on the second AC signal so that the down hole unit 52 receives a desired power level.

Alternatively, if a data signal is lost and effectively stops transmitting to surface, microprocessor 38 can transmit a fixed voltage/power and sweep the frequency of the second AC signal. In this embodiment, the tuned HV AC coupling 36 at the input to the down hole unit 52, will transmit a power profile dependent on the transmitted frequency. When a power is transmitted which operates the down hole instrumentation 54, the regulator 58 will transmit a signal to alert the surface 28 that power is received and how it compares to the desired power. This process dynamically alters both the power delivery to the down hole unit and also the harmonic interference of the power unit with the carriers frequencies. This technique overcomes the problem of the frequency response and loading seen by the monitoring system of the motor system varies considerably when faults appear and quite differently depending on the nature of the fault.

The loss of a data signal can also be used to alert a user to their being a likely fault on the cable 26. It should be noted that the first AC signal to the motor can be turned off while the second AC signal may still be transmitted. In this arrangement, the monitoring system 54 at the down hole unit 52 can still operate and send data signals to surface 28 even when the motor is not running.

Figure 4:
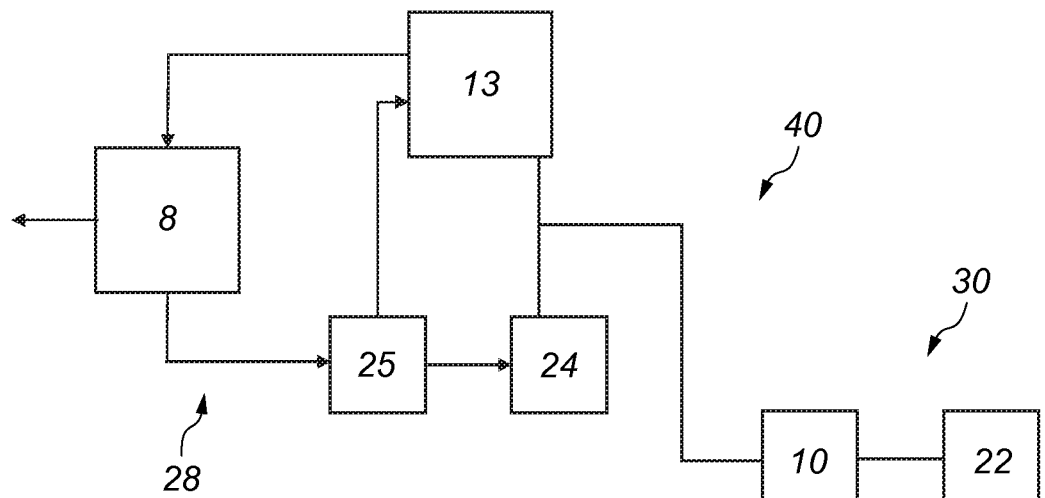
FIG. 4 shows a schematic block diagram of a data communications system according to a further embodiment of the present invention.

With reference to FIG. 4 there is shown a data communications system 40 according to an embodiment of the present invention, the system 40 comprising surface system module 28 and sub-surface system module 30 connected via three phase power cable 26. Like parts to those FIG. 1 have been given the same reference numerals to aid clarity. The surface system module 28 is provided with a high voltage unit 13, a 3 phase power transformer 24, an input regulator 25 and a low voltage unit 8. The sub-surface system module 30 is provided with an ESP motor system 10 and an instrument system 22.

In use, when the data communication channel is operational, that is to say data may be transmitted through cable 26, the high voltage unit 13 applies an AC voltage to said cable 26. Data is transmitted from instrumentation system 22 using said cabled connection 26. The data collected and transmitted from instrumentation 22 includes data which determines the power applied across the sub-surface system 30. The data relating to the voltage applied can be recorded as a reading and this can be the determined data which is transmitted. Upon receipt of the determined data the LV system 8 acts upon the determined data and provides an output representative of the said data to input regulator 25 which acts to vary said applied power in response to determined data by acting upon the power transformer 24. The applied power can alternatively be varied by using the determined data from the LV system 8 to act upon input regulator 25 to vary the AC voltage applied by the high voltage unit 13 to alter the selected frequency and/or amplitude of the power applied to the sub-surface system 30.

Figure 5:
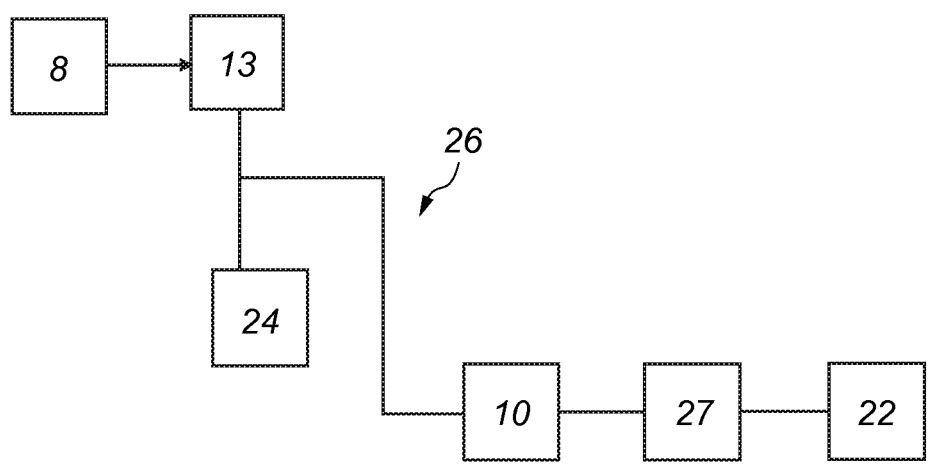
FIG. 5 shows a schematic block diagram of a data communications system according to yet further embodiment of the present invention.

With reference to FIG. 5 there is shown another embodiment of the data communications system of the present invention wherein the surface system module 28 is provided with a high voltage unit 13, a 3 phase power transformer 24 and a low voltage unit 8. The sub-surface system module 28 is provided with a power circuit module 27, an ESP motor system 10 and an instrument system 22.

In use, the power circuit module 27 has a tuned response to the applied power frequency such that the power delivered to the instrument system, or tool, 22 can effectively be altered by changing the power frequency by still rejecting the motor power frequency which is at a lower frequency than the power frequency.

The applied power frequency is typically in the region between 500 Hz and 5 kHz and the operational frequency of the motor power frequency may be between 20 Hz to 60 Hz.

The principle advantage of the present invention is that it provides a method of data transmission over a three phase power system where the power delivered to the monitoring system is regulated to more effectively manage the monitoring system performance and enable operation over a very wide range of conditions.

Various modifications may be made to the invention herein described without departing from the scope thereof. For example the sub surface module may be designed to operate for short periods with a very wide range of applied power conditions so that data transmission is maintained at all times allowing the regulation to operate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A data communications system for transmitting data over a three phase power system between a surface location and a sub-surface location, the data communications system comprising:
   a surface system module provided with a first power supply providing a first AC power signal and a second power supply providing a second AC power signal;
   a sub-surface system module providing a first powered module and a second powered module, wherein the second powered module provides a data communications signal to the surface system module; and
   a cable connection provided between the surface system module and the sub-surface system module to transmit the first AC power signal, the second AC power signal, and the data communications signal to the surface system module,
   wherein the data communications signal transmitted to the surface system module provides an indication of power applied to the second powered module, and wherein the surface system module varies the second AC power signal in response to the received data communications signal.

2. The data communications system according to claim 1, wherein the second powered module comprises a processor configured to determine an applied voltage.

3. The data communications system according to claim 1, wherein the second AC power signal is regulated in response to the applied voltage.

4. The data communications system according to claim 1, wherein the second powered module comprises an AC coupling circuit.

5. The data communications system according to claim 1, wherein a frequency of the first AC power signal is in the range of 20 Hz to 60 Hz.

6. The data communications system according to claim 1, wherein a frequency of the second AC power signal is in the range of 500 Hz to 5 KHz.

7. The data communications system according to claim 1, wherein the first powered module is a motor assembly.

8. The data communications system according to claim 7, wherein the first powered module is an ESP motor system.

9. The data communications system according to claim 1, wherein the second powered module is a monitoring system.

10. The data communications system according to claim 9, wherein the monitoring system comprises one or more gauges/sensors, and wherein the data communication signal comprises data from the one or more gauges/sensors.

11. The data communications system according to claim 1, wherein the first AC power signal is used to power the first powered module, and the second AC power signal is used to power the second powered module.

12. A method of data transmission for transmitting data over a three phase power system between a surface location and a sub-surface location, the method comprising:
   (a) providing a cabled connection from a surface system to a sub-surface system;
   (b) providing a first AC power signal and a second AC power signal down the cabled connection to the sub-surface system;
   (c) determining power applied at a unit of the sub-surface location;
   (d) communicating a data signal indicative of the determined power applied up the cabled connection to the surface system; and (e) varying an AC power signal at the surface system to vary the power applied to the sub-surface system, in response to the communicated data signal.

13. The method of data transmission according to claim 12, further comprising setting a desired power level required by the unit.

14. The method of data transmission according to claim 12, wherein step (d) comprises transmitting a voltage applied to the unit.

15. The method of data transmission according to claim 12, further comprising providing a feedback loop to actively control the power applied at the unit.

16. The method of data transmission according to claim 12, wherein the first AC power signal is used to power a down hole motor assembly.

17. The method of data transmission according to claim 12, wherein the first AC power signal is in a frequency range of 20 Hz to 60 Hz.

18. The method of data transmission according to claim 12, wherein the second AC power signal is used to power a down hole monitoring system.

19. The method of data transmission according to claim 12, wherein the second AC power signal is in a frequency range of 500 Hz to 5 KHz.

20. The method of data transmission according to claim 18, wherein the down hole monitoring system comprises a tuned circuit to prevent transmission of the first AC power signal from reaching the down hole monitoring system.

21. The method of data transmission according to claim 12, further comprising varying frequency of the second AC power signal.

22. The method of data transmission according to claim 21, further comprising sweeping the frequency of the second AC power signal.

23. The method of data transmission according to claim 22, wherein sweeping the frequency is performed if no data signal is received at the surface system or if the data signal is lost.

24. The method of data transmission according to claim 22, wherein the frequency is swept until the data signal is received.

25. The method of data transmission according to claim 12, wherein a sudden change in the indicative power applied via the data signal is used to alert a user to a possible fault in the cabled connection.

26. The method of data transmission according to claim 25, wherein on detection of a fault the first AC power signal is removed while still transmitting data from a down hole monitoring system.

* * * * *